Aug. 8, 1944.   B. CASTIGLIA   2,355,274
WHEEL SUSPENSION
Filed April 29, 1941   3 Sheets-Sheet 1
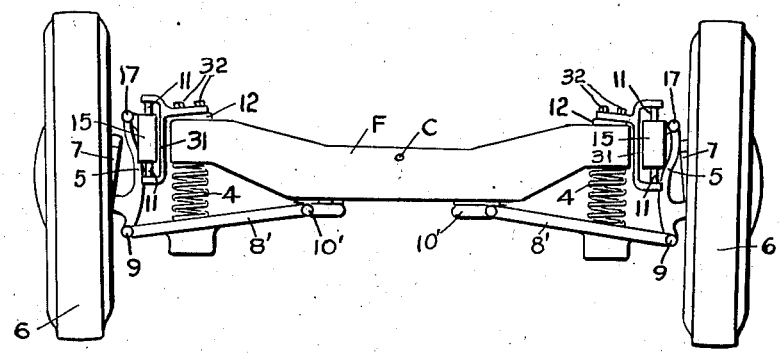
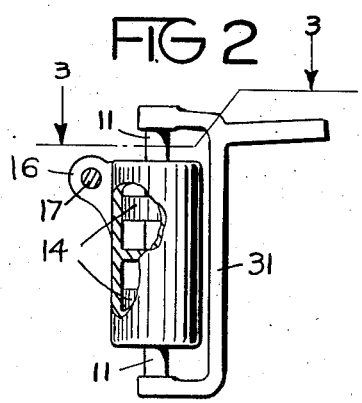
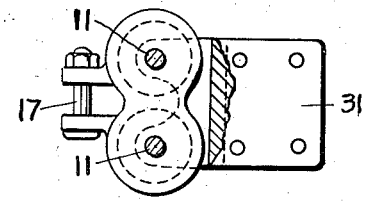
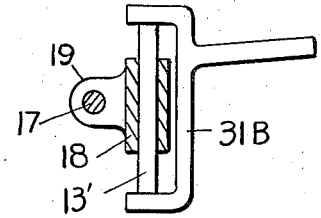
INVENTOR.
BIAGIS CASTIGLIA.
BY
Paul A. Talbot.
ATTORNEY.

Aug. 8, 1944.  B. CASTIGLIA  2,355,274
WHEEL SUSPENSION
Filed April 29, 1941  3 Sheets-Sheet 2
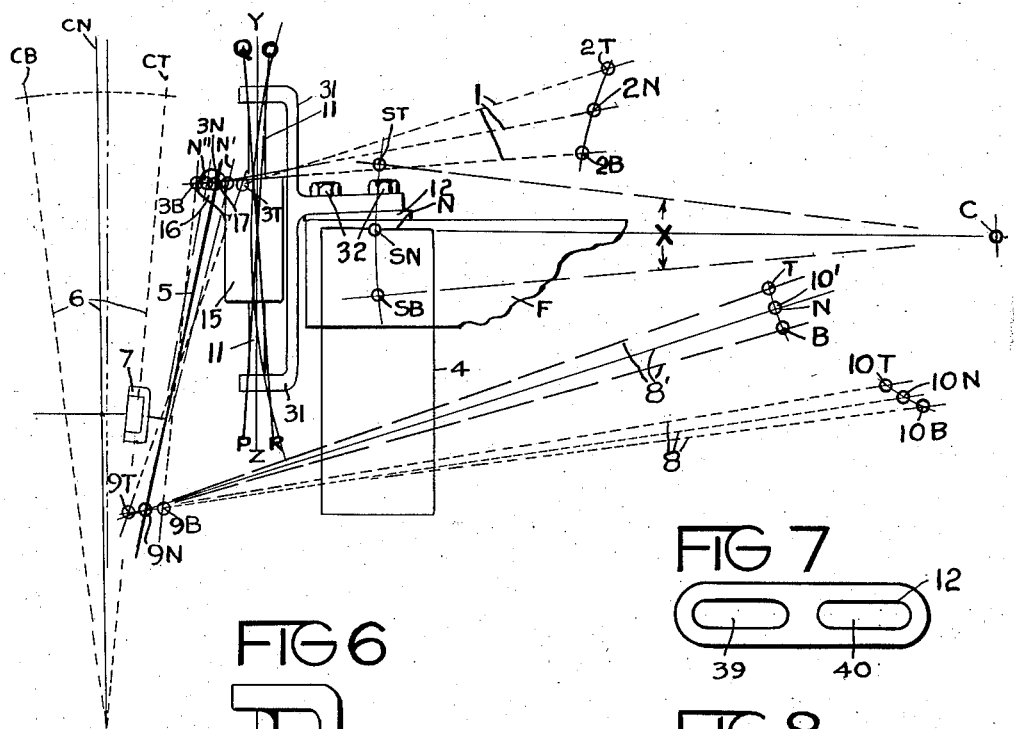
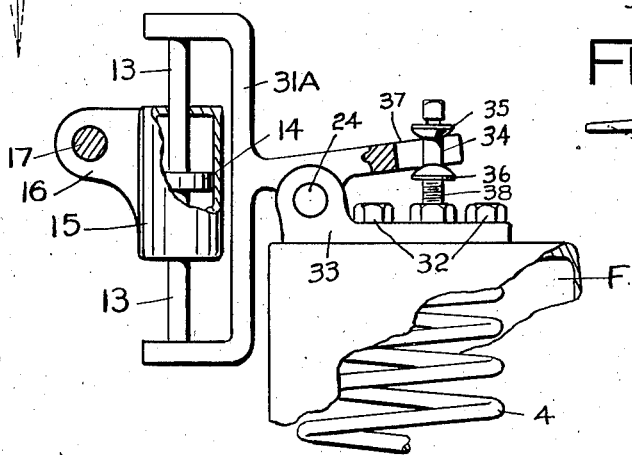
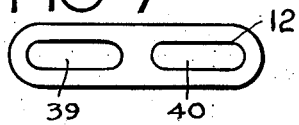
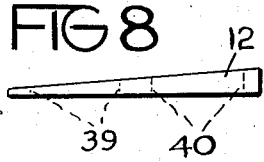
INVENTOR.
BIAGIS CASTIGLIA.
BY Paul A. Talbot.
ATTORNEY.

Aug. 8, 1944. B. CASTIGLIA 2,355,274
WHEEL SUSPENSION
Filed April 29, 1941 3 Sheets-Sheet 3
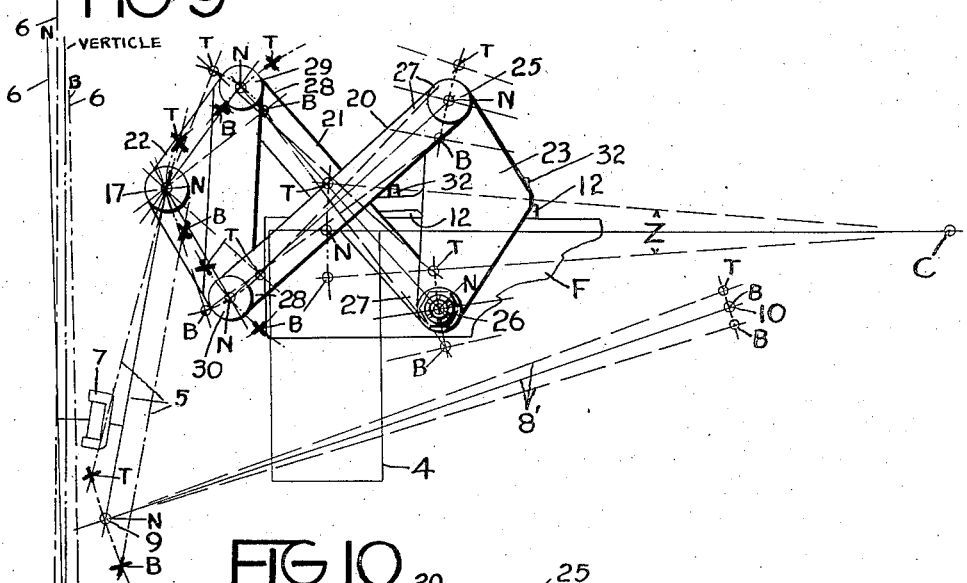
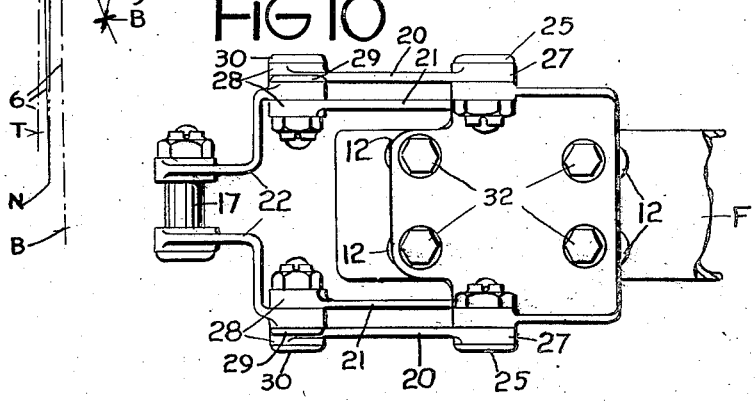
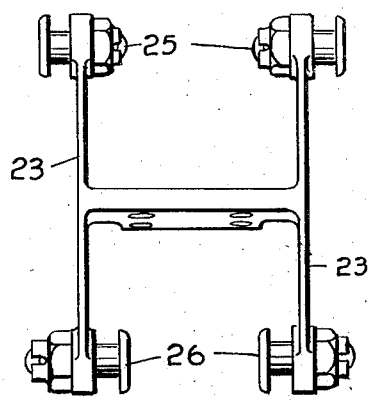
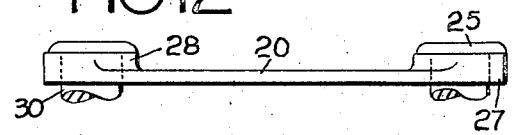
INVENTOR.
BIAGIS CASTIGLIA.
BY Paul A. Talbot.
ATTORNEY.

Patented Aug. 8, 1944

2,355,274

UNITED STATES PATENT OFFICE 2,355,274

WHEEL SUSPENSION

Biagis Castiglia, New York, N. Y., assignor to Wheel Aligning Necessities, Inc., New York, N. Y.

Application April 29, 1941, Serial No. 390,860

4 Claims. (Cl. 267—20)

My invention relates to the securement of wheels to the chassis of vehicles and particularly to independent movement of the wheel in relation to the chassis to reduce the change in camber of the wheel by rolling or tipping the chassis. Among the purposes and objects of my invention are to provide:

A means of independently securing the wheel to the chassis which permits movement between the chassis and wheel with a minimum variation of camber.

A wheel suspension which does not substantially change the camber of the wheel by rolling or unequal loading of the chassis.

A chassis which may be tipped out of normal level or horizontal position relative to the road without the usual change of camber of the wheel.

A convenient combination of shock absorber and wheel suspension.

A wheel suspension having a guide between the wheel and chassis.

An adjustable guide between the wheel and chassis.

I accomplish these and other purposes and objects by the construction hereinafter set forth and illustrated in the drawings forming a part hereof, in which:

Fig. 1 is a front elevation of a typical front end of the chassis and wheels showing the application of my wheel suspension.

Fig. 2 is a sectional elevation detail of the guide and shock absorber combined.

Fig. 3 is a plan and section at 3—3, Fig. 2.

Fig. 4 is a sectional elevation of a modification of the guide without the shock absorber combined.

Fig. 5 is a diagrammatic view showing the travel of the various parts on their centers.

Fig. 6 is a fragmentary detail of the adjusting or tilting means for the guide.

Fig. 7 is a plan view of one of the adjusting compensators.

Fig. 8 is an elevation of one of the adjusting compensators.

Fig. 9 is a modification and a diagrammatic view of the cross link guide showing the movement of the centers due to roll of the chassis.

Fig. 10 is a plan view of one of the cross link guides.

Fig. 11 is an end elevation of one of the cross link guide brackets.

Fig. 12 is a plan view of one of the cross links.

Similar reference characters refer to similar parts throughout the several views of the drawings and in the specification to follow.

The independent suspension of vehicle wheels, particularly the front wheels of automobiles commonly known as the knee action, has resulted in an increase of riding comfort. The proper camber and caster of the wheel so suspended have been the subject of much controversy, and the angle of the camber of the wheel, which may vary from one-half to one and one-half degrees depending on the make and type of automobiles, may be accurately adjusted.

The adjustment of the camber, however, when the wheels of the car are aligned, may be perfect when the car is unoccupied or at rest, but when the car is unequally loaded or traversing a curve at high speed, may be far from perfect.

The inaccuracy of the camber adjustment under unequal loading, or due to centrifugal force, may cause the chassis to be out of level or not parallel with the road on which it travels. This abnormal relationship between the chassis and wheels, I will call the roll or the roll of the chassis for the purpose of brevity in describing the effect this has on the wheel suspension and the camber angle.

The effect of the roll may be followed by referring to the diagrammatic view, Fig. 5, which shows the normal position of the chassis and wheel in full lines and the center lines of the parts in light full lines. The rolling of the chassis is indicated by broken lines. Dotted lines show the same roll of a typical ordinary independent wheel suspension. Some of the parts are shown in fragmentary form to identify their general position. The center lines or outlines may represent the similar parts.

The angle of roll $x$, Fig. 5, for the conventional suspension may be followed by the dotted lines in which the upper control link 1 is pivoted at one end at 2, the normal position N moves to T at the top end of travel and B at the bottom end of travel of the roll of the chassis. The opposite end 3 of the upper control link 1 moves to the positions 3T and 3B respectively. The position 3B at the end 3 moves outwardly or away from the center C on which the chassis rolls.

The center SN of the top end of the spring 4, which moves to the positions ST and SB, determines the horizontal position of the center C. It may thus be seen that the bottom position of the roll of the chassis in the ordinary suspension causes a part of the movement of the camber from the normal position CN to CB by moving the end 3, which is pivotally connected to the top end of the usual suspension arm 5, which is connected to the wheel 6 through the steering knuckle 7, causing the wheel to be moved in exact relation to said arm and to thus directly change the camber of the wheel.

The other part of the movement of the arm 5 and wheel 6 is caused by the lower control link 8 which is pivotally connected at its end 9 to the bottom end of the arm 5. The other end 10 of said lower control link 8 is pivotally connected, as is the end 2 of the upper control link, to the chassis or frame F, both said ends 10 and 2 thus are rolled on arcs from the center C to the positions 2T and 2B, and 10T and 10B, moving the links to the positions 3T and 3B, and 9T and 9B, at their ends 3, and 9T and 9B at their ends 9. It is to be noted that the position 9B at 9 is moved inwardly or toward the center C while the position 3B at the end 3 is moved outwardly, which causes a greater movement or change of camber when combined than either link 1 or 8 would change the camber separately.

By changing the position of the pivotal connection 10 of the lower control line 8' to approximately a position on a direct line between C and 9 to 10', the horizontal movement of 9 is thus substantially eliminated by the roll of the chassis F.

The elimination, redirection, or reversal of the horizontal movement of the end 3 may be accomplished by substituting my adjustable vertical guides 11 for the upper control link 1.

I have shown my guide 11 as adjustably secured to the frame F of the chassis by means of a tilting wedge or compensator 12. I do not wish, however, to be limited to the means of adjusting the vertical alignment of my guide 11 in relation to the chassis or axle cross frame F by the compensator shown, as obviously numerous adjustable securements may be substituted, one of which is shown in Fig. 6, hereinafter described.

The guide 11 on each side of the vehicle may be comprised of a pair of rods to which are secured the shock absorbing pistons 14, both of which freely travel in the cylinders 15 which are pivotally connected by the lugs 16 and pins 17 to the top end of the arm 5, thereby replacing the usual upper control arm, the end 3 of which ordinarily connects to the upper end of the arm 5.

The guide 11, with its piston, not only guides one end of the arm 5 and the wheel secured to to it, but serves as the shock absorber. In Fig. 4, I have shown a modification in which the rods 13' engage the guide joints 18 which have boss 19 adapted to pivotally connect the joints 18 to the upper end of the arms 5 by means of the pins 17.

In Fig. 9, I have shown diagrammatically a substitute for the guides 11 in which pairs of cross links 20 and 21 are connected to the top end of the arms 5 by the pins 17, by the swinging brackets 22, as well as to the cross axle frame F by the adjustable brackets 23.

Either the guides 11 or the cross links 20 and 21 may be adjusted to provide no movement or an outward or an inward movement to the top end of the arm 5 by rolling the chassis and frame 5 in one direction. The brackets 23 and guide brackets 31 are tilted to accomplish this adjustment of movement due to the roll of the chassis or frame. These guiding means for the prevention of change in the camber of the wheel due to roll, do not cause a detrimental effect, usual by the raising and dropping of the wheel in the normal action of the movement of the wheel over irregularities in the road over which the wheel travels. The extreme camber angle, which ordinarily occurs when driving around curves, or due to heavy loading on one side, is thus overcome.

The brackets 23, which are adjustably secured at or near each of the ends of the axle cross frame F, are preferably provided with the top pins 25 and bottom pins 26 swingingly engaging the inner ends 27 of the links 20 and 21. The outer ends 28 are swingingly connected to the top pins 29 and bottom pins 30 in the swinging brackets 22. The pins 17 engage the swinging brackets between the upper and lower pins 29 and 30 which swing about said pins 17 and thus the top end of the arm 5, in which said pins 17 are mounted without moving said pin 17.

I have shown the brackets 23 as tiltable in the same manner as the guide brackets 31, in which the wedge shaped compensators 12 may be removed or turned end for end.

The bracket 23 may, however, be tilted in various ways, and the construction shown in Fig. 6 may be employed to tilt said brackets which are thus adjustably secured to the axle frame F. The tilting of the brackets 23 one way or the other way from the neutral position shown in Fig. 9 causes the pin 17 to move outward or inward from this neutral position. This outward or inward movement of the pin 17, whether accomplished by the guides 11 which are tilted or inclined by tilting the guide bracket 31 or by tilting the brackets 23, provides an adjustment from no movement of the pin 17 to the desired movement in either direction. This adjustment makes it possible to regulate the vertical travel of the wheel from a minus camber angle at the raised position to a plus camber angle.

When the brackets are adjusted to eliminate the change in camber by rolling, the wheels will have a minus camber when raised, such as over a bump, and a plus camber angle when the wheel drops into a hole. The variation in camber angle, however, is not as great as the variation caused by the roll of the chassis, as illustrated in Fig. 5 of the drawings. The amount of variation of camber angle, due to vertical travel of the wheel, when the brackets 23 and 31 are adjusted so that no change of camber angle occurs when the chassis is rolled, is shown by the dot and dash lines, Fig. 9. The centers of movement of the parts moved by the wheel are indicated by $(x)$. The centers of the movement of the parts moved by the roll of the chassis are indicated by $(o)$. In each case, the normal or neutral position is indicated by N, the top position of travel by T and the bottom position of travel by B.

The links 20, when the wheel 6 is raised to T, swing on the pins 25 and the links 21 swing on the pins 26 to the point T on their respective arcs of travel. The pins 29 and 30 on the swinging brackets and the pin 17 to raise to the points T, the centers being indicated by $(x)$.

The lower control link 8' swings about the end 10 and the end 9 raises to the point T. The arm 5 thus is disposed at the position indicated by the dot and dash line between the positions T—T. The reversal or dropping of the wheel to B moves the various parts in like manner but in the opposite position causing the arm 5 to be disposed on the dot and dash line B—B. The angle between the lines T—T and B—B is the change of angle at the top and bottom travel of the wheel. The angle between N—N and either of the lines T—T or B—B is the change of angle of camber from normal to the extremes of travel at top and bottom travel of the wheel.

In Fig. 9, the roll of the chassis is shown by the centers $(o)$ of the various parts and the movements of the arm 5 and the pin 17 and bottom end 9 thereof is too small to be indicated.

A comparison between the angle of camber indicated in Fig. 5 by dotted lines due to the roll of the chassis and the full lines of either of the Figs. 5 or 9, illustrates the advantages of my guides which replace the ordinary upper control arm of the usual knee action or independent wheel suspension.

The guide brackets 31, 31A and 31B, or the bracket 23, may be adjustably secured to the usual axle frame F replacing the usual upper control link and shock absorber. The pin 17 on the usual arm 5 may be used in connecting my device to existing automobiles, replacing the old parts.

My device may also be provided and form a part of a new car as manufactured at the factory. The manner of securing the parts of my device to automobiles of various designs and makes is not of importance except as to the adjustment of the brackets in adjusting the camber.

I have shown a plurality of bolts 32 securing the brackets to the chassis or axle frame F. These bolts 32, however, may be the same as now used in attaching the upper control link and/or shock absorber which may be replaced by my device.

The brackets 31A, shown in Fig. 6 of the drawings, are swingingly secured to the axle cross frame F by the pins 24 mounted in the pivot plates 33 secured to the axle cross frame F by the bolts 32. The adjustment by tilting the brackets 31A is accomplished by the screws 34 having collars 35 and 36 which engage the bifurcated arms 37, thereby raising and lowering said arm. The screws 34 are threaded 38 to engage threaded apertures in the pivot plates 33.

When the brackets 31 or 31A and B are tilted in relation to the frame F from the position indicated by the vertical center line YZ of the guides 11, as shown in Fig. 5 of the drawings, to either the centerline OP or QR, the top end of the arm 5 and the pin 17 may be guided to move outwardly or inwardly in relation to the center C to increase or reverse the camber of the wheel 6 as desired. The movement is represented by N' and N'' as affecting the pin 17.

The compensators, Figs. 7 and 8, are preferably provided with slots 39 and 40 which receive the bolts 32, permitting vertical adjustment of the brackets 23 and 31 as well as to suit the centers of the bolts 32.

The springs 4 are supported at their lower ends by the lower control links 8 or 8' and rest at their top ends on or within the frame F. The position of the top end of the spring which moves up and down or about the center C when the chassis is rolled or unevenly loaded is important in determining the position and adjustment of my guides as well as the securement of the end 10 or 10' of the inner end of the lower control arm. The center C is located between the top and bottom travel vertically of the spring.

Likewise, the position of the bottom end of the spring is between the top and bottom travel as affected by the travel of the wheel.

I have herein shown and described in detail the construction of my device and some of the modifications so that it may be understood by those skilled in the art to which this invention pertains. I do not wish to be limited to the details of construction herein disclosed, as this disclosure is intended to illustrate rather than limit. The parts and their operation are but a few of the constructions capable of producing the results and principles of which they are an embodiment and illustrate these underlying principles. I may wish to depart from the details of construction within the scope of the appended claims which set forth my invention.

I claim:

1. In an independent wheel suspension for vehicles, a wheel and a supporting arm secured to and movable with said wheel, said arm having a pivotal connection at its top and bottom ends, a chassis frame movably secured to the bottom end of said arm by a lower control link and to the top end of said arm by a bracket secured to said frame and guide means and a pivotally connected bracket secured to said arm and guide means, said top pivotal connection and bracket being limited by said guide means to substantial vertical travel to maintain a substantially unchanged camber, said guide means comprising cross links each having one end secured to said bracket on said frame and each having its opposite end secured to said bracket pivotally secured to said arm.

2. In an independent wheel suspension for vehicles, a wheel and a supporting arm secured to and movable with said wheel, said arm having a pivotal connection at its top and bottom ends, a chassis frame movably secured to the bottom end of said arm by a lower control link and to the top end of said arm by a bracket secured to said frame and guide means and a pivotally connected bracket secured to said arm and guide means, said top pivotal connection and bracket being limited by said guide means to substantial vertical travel to maintain a substantially unchanged camber, said guide means comprising cross links each having one end secured to said bracket on said frame and each having its opposite end secured to said bracket pivotally secured to said arm, the top end of the bracket secured to the frame being secured to the bottom of the bracket pivotally secured to said arm by part of said links and the bottom of said bracket secured to said frame being secured to the top of said bracket pivotally secured to said arm by the other of said links.

3. In a wheel support for vehicles, a bracket secured to the frame of the vehicle, a vehicle wheel and supporting arm therefor and a swinging bracket swingly secured to said vehicle wheel supporting arm, a control link swingingly secured to said frame and to one end of said arm and cross links each swingingly securing the top of one of said brackets to the bottom of the other of said brackets, said bracket, said swinging bracket, said control link, and said cross links substantially preventing a change in camber of said wheel throughout its vertical movement and the movement of the frame of the vehicle.

4. In a wheel support for vehicles having a vehicle frame, wheels and supporting arms therefor, a bracket secured to said frame of the vehicle and a swinging bracket swingingly secured to one of said vehicle wheel's supporting arms, a control link swingingly secured to said frame and to one end of said arm and cross links each swingingly securing the top of one of said brackets to the bottom of the other of said brackets, and the bottom end of the same bracket to the top end of the other bracket, whereby said arm may be guided and said wheel may be connected to the frame to maintain a substantially constant camber to said wheel throughout the movement of either the wheel or the chassis frame.

BIAGIS CASTIGLIA.